F. P. HUMMEL.
ROTARY ENGINE.
APPLICATION FILED MAY 7, 1910.
1,023,782.
Patented Apr. 16, 1912.
4 SHEETS—SHEET 3.
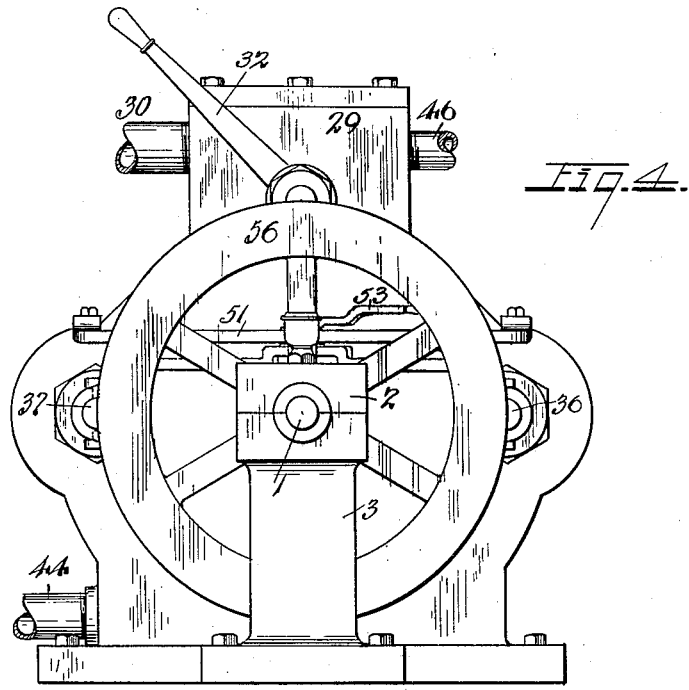
Fig. 4.
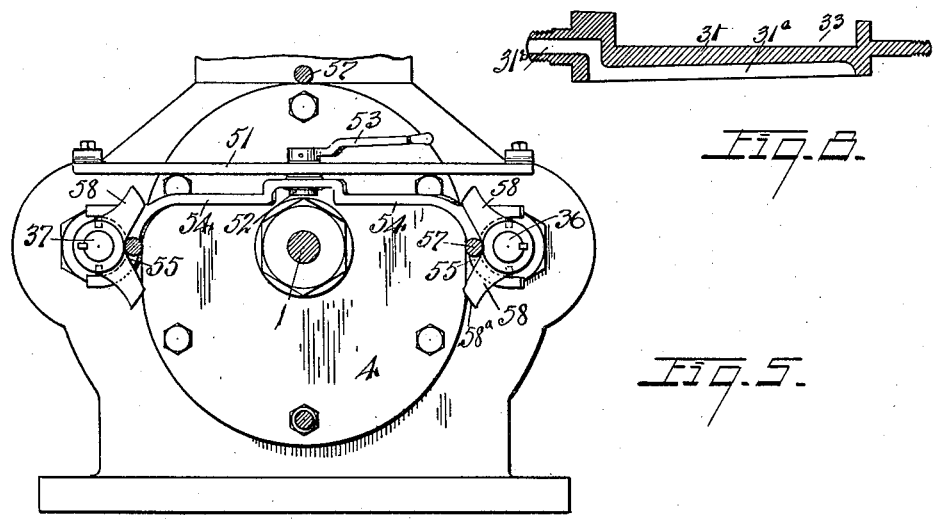
Fig. 6.
Fig. 5.
Witnesses.
Oliver M. Kappler.
Brennan B. West.
Inventor
Franklin P. Hummel
By Bates, Fouts & Hull
Attys F. P. HUMMEL.
ROTARY ENGINE.
APPLICATION FILED MAY 7, 1910.
1,023,782.
Patented Apr. 16, 1912.
4 SHEETS—SHEET 4.
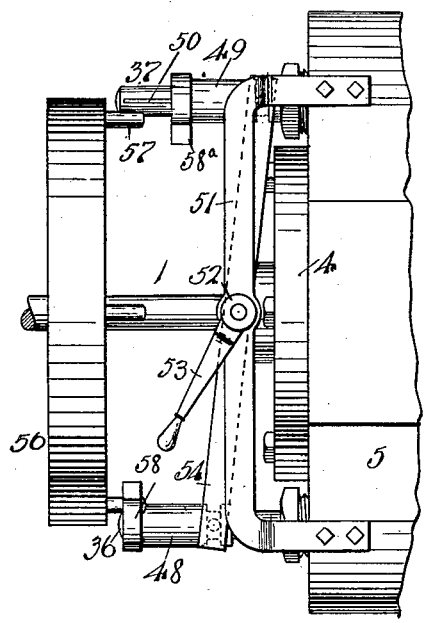
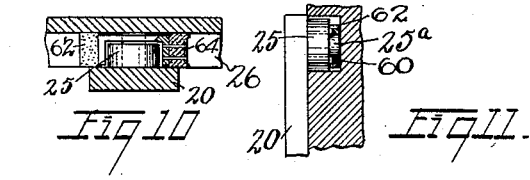
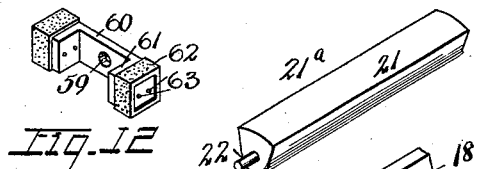
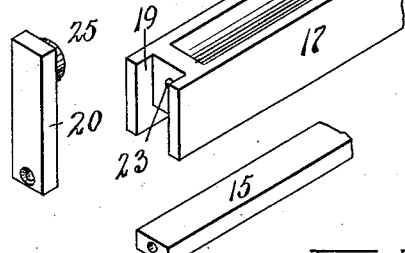
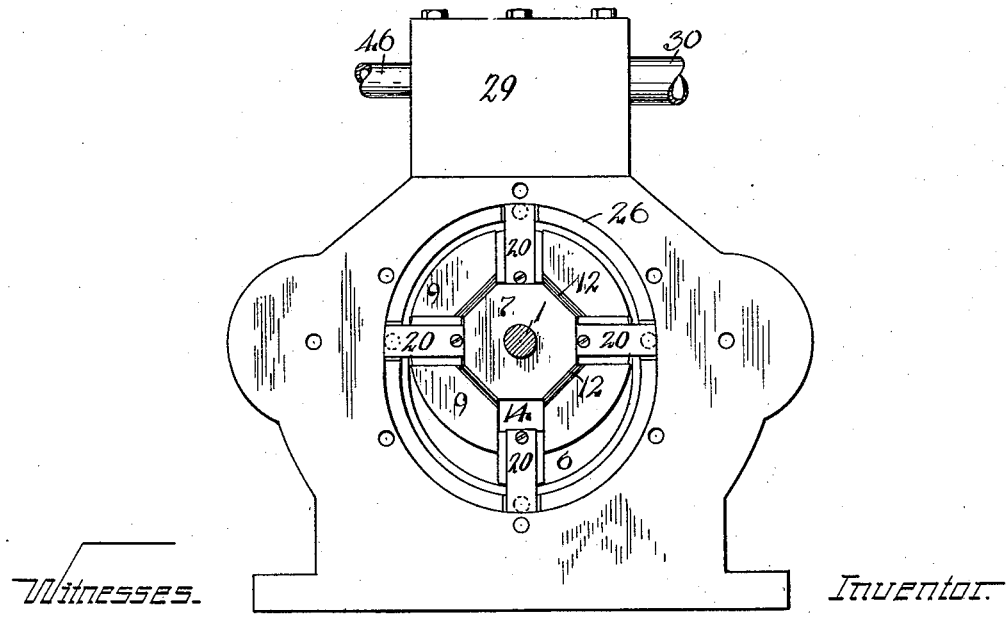
Witnesses.
Oliver M. Kappler
Brennan West
Inventor.
Franklin P. Hummel,
By Bates, Fouts & Hull
Attys

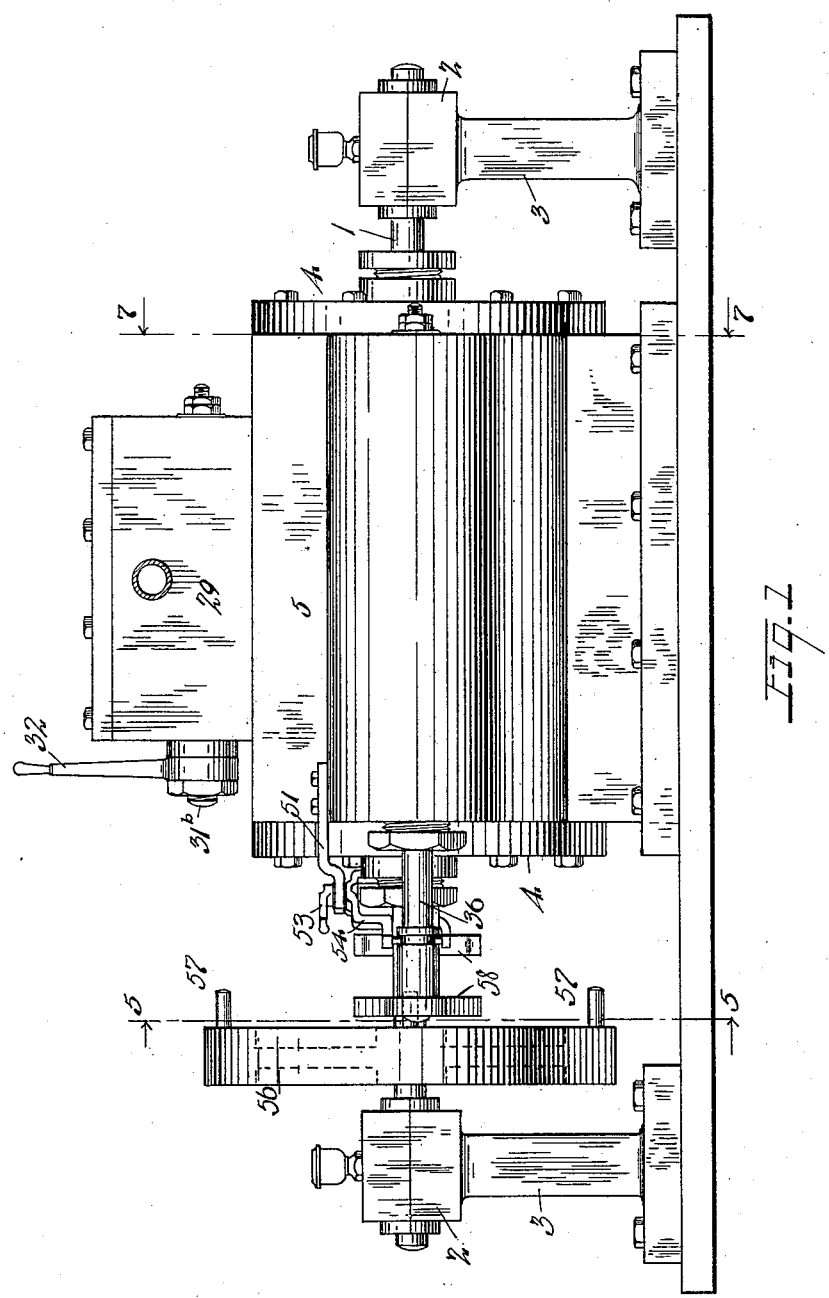

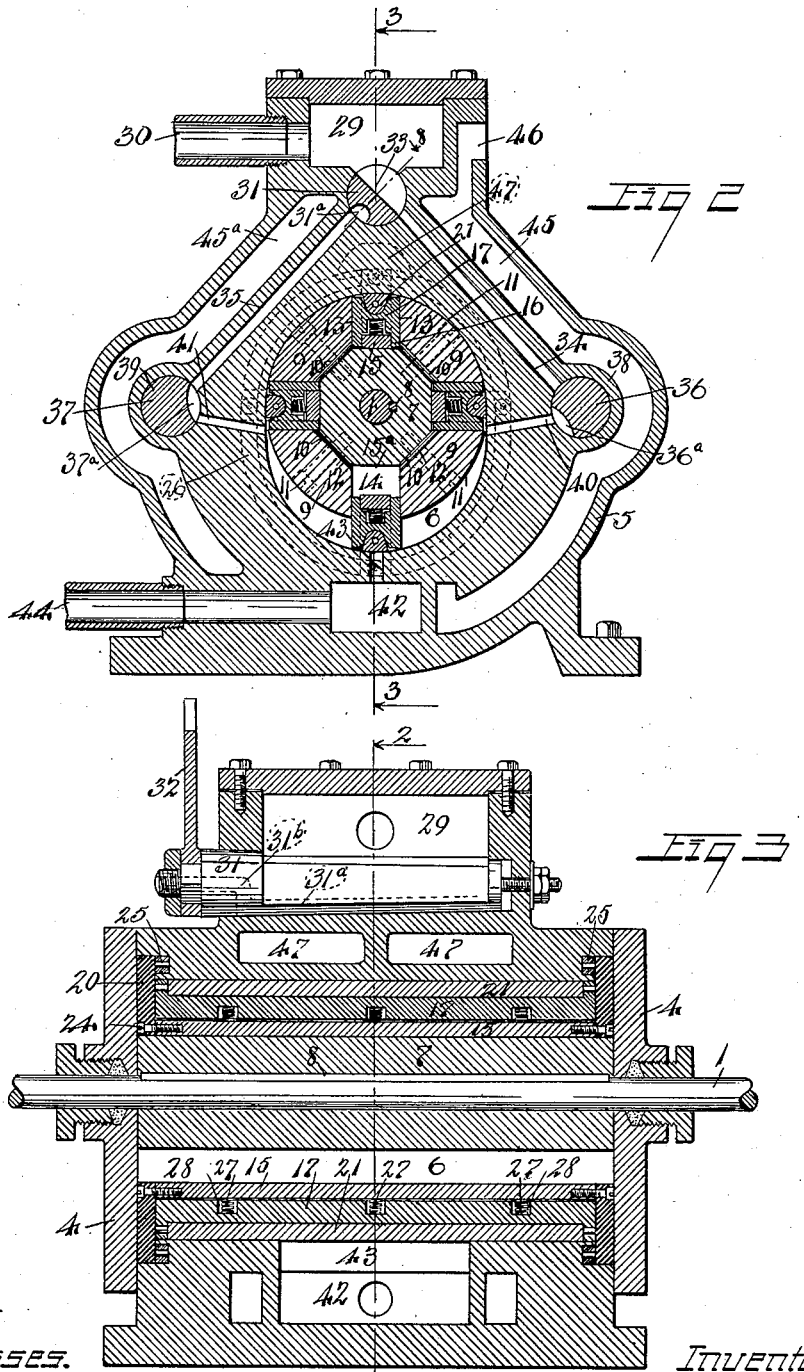

UNITED STATES PATENT OFFICE.

FRANKLIN P. HUMMEL, OF BELLEVUE, OHIO, ASSIGNOR OF ONE-THIRD TO FRANK A. HIGGINS, OF BELLEVUE, OHIO.

ROTARY ENGINE.

1,023,782. Specification of Letters Patent. Patented Apr. 16, 1912.

Application filed May 7, 1910. Serial No. 559,995.

*To all whom it may concern:*

Be it known that I, FRANKLIN P. HUMMEL, a citizen of the United States, residing at Bellevue, in the county of Huron and State of Ohio, have invented a certain new and useful Improvement in Rotary Engines, of which the following is a full, clear, and exact description, reference being had to the accompanying drawings.

This invention relates to rotary engines and has for its general object to promote the efficiency of engines of this type. With the view of accomplishing this result the invention contemplates a construction and arrangement of parts by which the expansive power of the impelling fluid may be utilized with a maximum of efficiency; also a construction whereby back pressure may be substantially eliminated; also a novel construction and means for operating the piston blades; also an improved construction and arrangement of means for driving the engine in reverse directions.

With the foregoing objects in view, the invention may be defined further as consisting of the combinations of parts and elements embodied in the claims annexed hereto and exemplified in the drawings forming a part hereof, wherein—

Figure 1 represents a side elevation of an engine constructed in accordance with my invention; Fig. 2 a central vertical sectional view taken through the cylinder and valve chest on substantially the line 2—2 of Fig. 3, looking in the direction of the arrows; Fig. 3 is a longitudinal sectional view corresponding to the line 3—3 of Fig. 2 and looking in the direction of the arrow; Fig. 4 represents an end elevation of that end of the engine which is provided with the automatic valve-operating mechanism; Fig. 5 a view corresponding to the line 5—5 of Fig. 1; Fig. 6 represents an enlarged plan view of the same end of the cylinder; Fig. 7 a detail, partly in section and partly in elevation, corresponding to the line 7—7 of Fig. 1; Fig. 8 is a sectional detail of the throttle valve corresponding to the line 8—8 of Fig. 2; Fig. 9 is a view illustrating in perspective the various members comprising one of the blades; Figs. 10 and 11 represent sectional details of a roller and cam track for operating the blades; and Fig. 12 is a perspective view of the packing member which prevents leakage between the roller and the cam track.

Describing the parts in detail, 1 denotes the engine shaft mounted in bearings 2, of any desirable construction, the bearings being supported by suitable posts 3. This shaft extends through the opposite head 4 of the cylinder 5. This cylinder is provided with a bore 6, which is generally elliptical in section, and the shaft extends through said bore above the center thereof and is provided within such bore with a cylindrical rotor. This rotor comprises an inner section 7 which is keyed to the shaft, as shown at 8, and is polygonal in section, being shown as octagonal. Wedge-shaped blocks 9 are bolted to alternate faces of the polygonal section 7, each block having an inner face 10 complementary to the corresponding face of the inner section 7 and having a convex outer surface 11. Between the inner face 10 of each block and the complementary face of the rotor section 7, there are interposed a series of shims 12, by the removal of which the blocks 9 may be brought closer to such section. The adjacent side faces 13 of the blocks are parallel to provide guide-ways 14 for the piston blades.

In each guide-way there is slidably mounted a compound piston blade, which will now be described.

Each piston blade comprises a base member 15 which, when the blades are in their extreme inward position, is adapted to rest upon the adjacent face 15$^a$ of the rotor section 7. This base member is of less width than the guide-way 14 and fits between the opposed depending sides or legs 16 of the second member 17. The member 17 is provided with a concave recess 18 in the outer surface thereof and has its end portions provided each with a recess which extends radially with respect to the rotor axis and is formed between the ends of the side walls, as shown at 19, for the reception of a hanger 20. In the concave recess 18 there is mounted the third blade member 21, said blade member having a rounded surface adapted to rock within the case of the recess 18 and having journal-pins 22 adapted to fit in corresponding apertures 23 at the opposite ends of the recess 18. The outer surface 21$^a$ of the member 21 is rounded, to conform with sufficient closeness to the adjacent inner surface of the cylinder bore 6. The lower end of the hanger 20 is connected to the adjacent end of the member 15, as by a screw 24, and the upper end of this hanger is provided with a roller 25, adapted to fit within a cam-track 26 formed in the cylinder wall, the body of the hanger fitting in the space 19. It will be observed, by reference to Figs. 2 and 7, that the cam-track 26 corresponds in curvature with the elliptical bore of the cylinder and is concentric therewith. Between the members 15 and 17 a suitable number of spiral springs 27 are interposed, said springs being conveniently mounted within recesses 28 provided in the member 17 and bearing at their inner ends against the member 15.

Above the cylinder 5 is mounted the chest 29 to which there is connected a pipe 30 for the supply of fluid thereto. In the bottom of the chest there is rotatably mounted a throttle and reversing valve 31 which controls the supply of the fluid to the regulating or cut-off valves. The valve 31 is shown as a rotary plug mounted in the casing and provided with an operating handle 32. The plug within the bottom of the valve chest is approximately semi-cylindrical in shape, whereby a port 33 is provided through which the fluid admitted to the chest may be distributed to either of the cut-off valves located on opposite sides of the bore 6. These valves are shown as located below the valve 31 and located symmetrically on opposite sides of the cylinder bore, the passageways 34 and 35 leading from the valve 31 at substantially right angles to each other and communicating at their upper ends with the seat for the latter valve.

The cut-off valves referred to are shown at 36 and 37. Each of these is mounted within a suitable projection 38, 39, of the cylinder casing. These valves are each shown as cylindrical, each having a segment cut away to provide a port $36^a$, $37^a$ adapted to bring the passageways 34 and 35 respectively in communication with the cylinder bore. The passages 40 and 41 are located about halfway of the height of the cylinder bore and directly opposite to each other and sufficiently below the axis of the rotor to bring the inner ends of the passageways below the outer members 23 of the piston blades when the rotor is in the position shown in the drawings. By the arrangement shown, the valve 31, by a quarter of a revolution clockwise, will place the chest 29 in communication with the passageway 35 and, by a quarter revolution in the reverse direction, will place the chest in communication with the passageway 34. The valve is provided in its lower or solid portion with a port $31^a$ which, when the chest is in communication with one of the passageways 34 or 35, will be in communication with the other passageway, for a purpose to be described hereinafter. The port $31^a$, as may be seen by reference to Fig. 8, extends through the hollow trunnion $31^b$ of the valve, to which trunnion the operating handle 32 is applied.

The cylinder casing is provided with an exhaust chamber 42 located intermediate of the passageways 34 and 35 and beneath the center of the bore 6 and communicating therewith by a port or passageway 43. The chamber 42 communicates with a suitable discharge pipe 44. The cylinder is provided with a jacket, which may be formed in casting, this jacket being shown as provided with a chamber 45 into which steam may be introduced, as through the port 46. In the event that steam is employed for driving the engine, the introduction of steam into the jacket will prevent condensation of the steam in the elliptical bore 6. The jacket extends substantially around the cylinder casing and substantially envelops the bore 6. The opposite branches 45, $45^a$ may be connected by transverse passageways 47, which are spaced apart at their centers to provide for the passageways 34 and 35.

While the bore 6 is generally elliptical in cross section, such section is not a true ellipse. A cross section of the bore is produced by two opposed semi-circles having their ends united, preferably by substantially straight lines extending tangentially between the opposed ends of the semi-circles. The diameter of the rotor will be substantially the same as the diameter of the semi-circles. By the shape of the rotor and the particular arrangement of the same within the bore 6, it will be seen that the rotor, for at least half of its circumference, fits snugly within the adjacent portion of the bore. It will be noted that, with the rotor in the position shown in Fig. 2, the opposed blade segments 21 are both slightly above the inner ends of the passageways 40 and 41 while the corresponding blade segment of the blade which is at the bottom of the cylinder has its center over the exhaust port 43. As the rotor turns farther, in the clockwise direction as indicated by the position of the valves, the blade adjacent to the port 40 will close this port at approximately the time when the corresponding segment of the lowermost blade passes beyond the port 43. By the time that the blade segment 21 clears the port 40, the valve 36 will be automatically rocked (by means to be described) to permit the fluid supplied through the passageway 34 to enter the cylinder bore 6 beyond said blade segment. As the rotor turns, the hanger members 20, in connection with the rollers 25 and the cam-track 26, maintain the blade in contact with the surface of the bore. The increasing surface of the blade is subjected to the pressure of the impelling fluid, with the development of substantially no back-pressure above atmosphere in opposition thereto. Before the blade has traveled a material distance between the port 40 and port 43, the valve 36 is automatically closed by means to be described and the impelling fluid operates expansively during the rest of the stroke of said blade to the exhaust port 43. To avoid the accumulation of any back-pressure on the blade traveling from port 43 to port 41, the valve 37 will be set in open position to allow the fluid that may be present in the rapidly contracting space to escape freely through passageways 41, 35, 31ª and 31ᵇ.

The means for automatically operating the valves 36 and 37 to enable the fluid to act expansively are shown in Figs. 4, 5 and 6. In these views, the outer ends of the shafts 36ᵇ and 37ᵇ are shown each as provided with sleeves 48, 49, respectively, the sleeves being connected to their respective shafts by means of a feather and a key-way, the key-way being shown at 50. 51 denotes a strap projecting from the cylinder end and supporting the hub 52 of a lever 53. The lower end of this hub rigidly supports a bracket, the opposite arms 54 of which are provided each with a yoke 55 pivotally connected to one of the sleeves 48 or 49. By operating the lever 53, either one of the sleeves 48 or 49 may be thrown outwardly while the other is automatically thrown inwardly. 56 denotes a disk mounted on the shaft 1 and having a plurality of pins or tappets 57 projecting inwardly therefrom, four such pins or tappets being shown, corresponding in number and position with the blades of the rotor. Each sleeve 48 is provided with a fork rigidly attached thereto, the arms of the fork being shown at 58. The outer end of each arm is beveled, as shown at 58ª. The arrangement is such that, as soon as a pin or tappet 57 engages a beveled surface 58ª, the sleeve and the corresponding shaft 36ᵇ or 37ᵇ is rocked. This rocking turns the corresponding valve so as to bring the port 36ª or 37ª into register with the passageways 34, 40 or 35, 41. As the pin or tappet moves out of the space between the arms 58, it engages the other arm and rocks the sleeve in the reverse direction, closing the valve 36 or 37. During the remaining cycle of the quarter revolution of the shaft 1, the fluid operates by expansion. When it is desired to reverse the engine, it is necessary to operate valve 31 to interchange the relation of inlet and outlet passages and to operate the lever 53 to reverse the position of the sleeves 48 and 49. This reversal will cause the pins or tappets 57 to automatically control the other valve 37 or 36.

It will be necessary, in order to permit the roller 25 to operate, that the width of the cam track be greater than the diameter of the roller. This, however, will permit the leakage from one side of the blade to the other around the roller. In order to prevent such leakage from occurring, the construction shown in Figs. 10, 11 and 12 is provided. The roller pin 25ª is adapted to enter an aperture 59 in the U-shaped frame 60, the flanges 61 of which have secured thereto suitable blocks of packing material, shown at 62. These blocks may be secured by means of rivets 63 extending through the flanges 61 and clamping plates 64. The blocks are of such size as fill the transverse area of the cam track and to bear against the hanger 20, thus preventing the leakage of steam or other operating fluid around the roller.

Among the advantages of my invention are the facility for reversing the same; the simple but effective means for compensating for the wear of the guides by the piston blade, such compensation being provided for by the removal of one or more of the shims which are interposed between each block and the central section 8 of the rotor; the efficient construction and means for operating the blades whereby a fluid-tight joint is provided at all times between each blade and the inner wall of the cylinder bore, with a minimum loss of power by friction; and the substantial elimination of any back-pressure on the piston blades, due to the construction and relative arrangement of the rotor and cylinder bore, the fluid inlet passages and the piston blades.

Various modifications of my invention may be devised, and hence I do not propose to be limited to the specific embodiment shown herein except as such limitation may be positively included in the claims or may be rendered necessary by the state of the prior art.

Having thus described my invention, what I claim is:

1. In a rotary engine, the combination of a casing having an elliptical bore and provided with opposed inlet passageways adapted to communicate with said bore, a single valve mechanism arranged to control the flow of fluid through either of said passageways to said bore and simultaneously to connect the other passage to the exhaust, a rotor mounted eccentrically in said bore, said rotor being of such conformation as to form a close fit with the bore for substantially half of its curved surface, piston blades slidably fitted to said rotor, and means, operative by the rotation of the rotor, for maintaining the outer edges of said blades substantially in contact with the interior of the cylinder bore.

2. In a rotary engine, the combination of a cylinder having a curved bore which is elongated in transverse section and is provided with opposed inlet passageways communicating with said bore, a rotor mounted eccentrically in said bore and of such conformation as to fit snugly the portion of the bore included between and at one side of said passageways, blades slidably supported by said rotor, and means independent of the inner wall of the cylinder whereby said blades may be positively moved inwardly and outwardly with respect to the rotor as the latter rotates, the rotor and the blades being so arranged that the blades will not project beyond the outer surface of the rotor until each has reached the appropriate supply passageway in the cycle of the rotor.

3. In a rotary engine, the combination of a casing, said casing being provided with a curved bore which is elongated in cross section and provided with opposed inlet ports, with means whereby fluid may be supplied through either of said ports to drive the engine in reverse directions and with an exhaust port located intermediate between the former ports, a rotor mounted in said bore at one side of the center thereof and arranged to conform to the adjacent surface of the bore for a substantial portion of its curved surface, blades slidably mounted in said rotor, and means independent of the inner wall of the cylinder for automatically and positively moving the blades inwardly and outwardly by the rotation of the rotor, the blades being so arranged that they are retained at the inner ends of their guide-ways while passing from one of said inlet ports to the other.

4. In a rotary engine, the combination of a casing, said casing being provided with a curved bore which is elongated in cross section and provided with opposed inlet ports, with means whereby fluid may be supplied through either of said ports to drive the engine in reverse directions, a rotor mounted in said bore at one side of the center thereof and arranged to conform to the adjacent interior surface of the bore for a substantial portion of its curved surface, a series of oppositely disposed blades slidably mounted in said rotor, and means independent of the inner wall of the cylinder for automatically moving the blades inwardly and outwardly by the rotation of the rotor, the number and arrangement of the blades being such that opposed blades are located on the same side of the ports and are retained at the inner ends of their guide-ways while passing from one of said ports to the other.

5. In a rotary engine, the combination of a cylinder having a bore, a rotor mounted eccentrically with respect to said bore, said rotor comprising a prismatic central body, a plurality of segmental blocks adjustably secured to said body, the adjacent blocks being spaced apart to form guide-ways therebetween, blades slidably mounted in said guide-ways, and means for moving the blades inwardly and outwardly in their guide-ways.

6. In a rotary engine, the combination of a cylinder having a bore, a rotor mounted in said bore, said rotor comprising a central body, segments having curved outer surfaces and adjustably secured to said body and having their adjacent ends spaced apart to form guide-ways, blades slidably mounted in said guide-ways, and means for operating said blades in said guideways.

7. In a rotary engine, the combination of a cylinder having a bore, a rotor mounted eccentrically in said bore, said rotor comprising an inner prismatic block, segmental blocks having curved outer surfaces secured to alternate faces of the block, shims interposed between each of the segmental blocks and the adjacent face of the prismatic block, the segmental blocks being spaced apart to provide guide-ways the bottoms of which are the remaining faces of the prismatic block, piston blades mounted in said guide-ways, and means for moving said blades in said guide-ways.

8. In a rotary engine, the combination of a cylinder having a bore, a rotor mounted eccentrically in said bore, said rotor comprising an inner block, segmental blocks having curved outer surfaces secured to said block, shims interposed between each of the segmental blocks and the adjacent portion of the block, the segmental blocks being spaced apart to provide guide-ways, piston blades mounted in said guide-ways, and means for moving said blades in said guide-ways.

9. The combination, with a cylinder having a bore, of a rotor mounted eccentrically with respect to said bore, a cam track surrounding each end of the cylinder and concentric therewith, said rotor having a plurality of guide-ways, a blade in each guide-way, each blade comprising an inner or base member, an outer member having at each end an outwardly extending recess, a hanger connected to each end of the inner member and mounted in the recess in the second member, springs interposed between said members, and means carried by the outer end of each hanger and engaging said cam track.

10. In a rotary engine, the combination of a casing having a cylinder bore therein, a rotor mounted in said bore, a valve chest having a valve-controlled outlet, passageways leading from said outlet to opposed portions of said bore, valves for controlling said passageways, a shaft for said rotor, and means driven by said shaft for automatically operating either of the latter valves, and means for simultaneously withdrawing the other of said valves from actuation by said operating means.

11. In a rotary engine, the combination of a cylinder casing having a bore, a rotor shaft in said bore, a rotor on said shaft, a valve chest, passageways leading from said chest to the cylinder bore, a valve arranged to direct fluid from said chest into either of said passageways, a valve for each of said passageways, and means, driven by said shaft, for automatically opening and closing either of the latter valves.

12. In a rotary engine, the combination of a casing having a cylinder bore, a rotor shaft mounted in said bore, a rotor on said shaft, a valve chest, diverging passageways leading from said chest to opposite portions of the cylinder bore, a valve arranged to direct fluid from said chest into either of said passageways, a rotatable valve for each of said passageways and means, driven by said shaft, for periodically rocking either of the latter valves.

13. In a rotary engine, the combination of a cylinder casing having a bore, a rotor shaft in said bore, a rotor on said shaft, passageways leading to opposite portions of said bore, a rotary valve plug for each of said passageways, and means for operating either of said plugs, said means comprising a sleeve in sliding engagement with each of said valves, a lever pivoted intermediate of its ends and having at each end a yoke for operating a sleeve, means whereby said lever may be rotated, projections carried by each sleeve, blades slidably mounted in said rotor, and a pin-carrying device mounted on the rotor shaft and having pins corresponding in number and angular arrangement with said blades and adapted to engage the projection on one or the other of said sleeves.

14. The combination, with a cylinder casing having a bore, of a rotor having a shaft in said bore, a plurality of blades slidably mounted in said rotor, means for operating said blades, fluid supply passageways communicating with opposite portions of the cylinder bore, a rotary valve arranged to control the supply of fluid through each passageway, means whereby either of said valves may be selected for oscillation, and means driven by the rotor shaft for oscillating the valve thus selected.

15. In a rotary engine, the combination of a cylinder casing having a bore which is elongated in cross section, a rotor mounted in said bore eccentrically thereof and arranged to contact with the inner surface of the bore throughout a substantial portion of its surface, inlet passageways communicating with opposite portions of the bore substantially at a point where the surface of the rotor diverges from that of the bore, blades slidably mounted in said rotor, means whereby said blades are moved inwardly and outwardly by the operation of the rotor, said casing being provided with an exhaust outlet intermediate between said passageways, a valve for each of said passageways, and a valve controlling the supply of fluid to either of said passageways, said valve having a by-pass outlet communicating with the passageway which is temporarily cut off from the source of supply.

16. In a rotary engine, the combination of a casing having a cylinder bore, a rotor in said bore, a fluid supply including a pair of passageways extending to opposite portions of the bore, a valve arranged to control the flow of fluid to either of said passageways, a valve in each of said branches and arranged to be oscillated to permit the flow of fluid therethrough periodically, connections whereby either of said valves may be so operated through the rotation of the rotor shaft, the casing being provided with an exhaust port located between the inlet ends of the former passageways, and a by-pass, including the temporarily inactive valve and its passageway, for relieving the back-pressure on a piston blade moving from the exhaust outlet toward the latter passageway.

17. In a rotary engine, the combination of a casing having a cylinder bore, a rotor in said bore, a fluid supply passageway extending to each side of the bore, a valve arranged to control the flow of fluid to either of said passageways, a cut-off valve for each passageway and adapted to be operated by the rotor, the casing being provided with an exhaust port located between said passageways, and a by-pass associated with said first mentioned valve and adapted to convert the passageway which is not at the time operating as an inlet into an auxiliary outlet.

18. In a rotary engine, the combination of a cylinder having a bore, a rotor mounted in said bore, a piston blade carried by said rotor and adapted to move inwardly and outwardly to contact with the interior of the cylinder bore, a cam track surrounding each end of said bore, a hanger connecting opposite portions of said blade with said track, and means carried by said hanger for preventing the passage of fluid from one side of the hanger to the other.

19. In a rotary engine, the combination of a cylinder having a bore, a rotor mounted in said bore, a piston blade carried by said rotor and adjustable to maintain the outer edge thereof in substantial engagement with the said bore, a cam track surrounding each end of the bore, hangers connected to opposite ends of the blade, a roller carried by each hanger and projecting into a cam track, a U-shaped frame supporting the outer end of each roller and mounted in each cam track, and packing secured to the flanges of said frame.

20. In a rotary engine, the combination of a cylinder having a bore, a rotor mounted in said bore, a piston blade carried by said rotor and adjustable to maintain the outer edge thereof in substantial engagement with the said bore, a cam track surrounding each end of the bore, hangers connected to opposite ends of the blade, a roller carried by each hanger and projecting into a cam track, and packing in the groove arranged to prevent the passage of fluid from one side of the roller to the other.

In testimony whereof, I hereunto affix my signature in the presence of two witnesses.

FRANKLIN P. HUMMEL.

Witnesses:
J. B. HULL,
A. J. HUDSON.

Copies of this patent may be obtained for five cents each, by addressing the "Commissioner of Patents, Washington, D. C."